United States Patent
Takata et al.

(10) Patent No.: US 12,506,538 B2
(45) Date of Patent: Dec. 23, 2025

(54) FREE-SPACE OPTICAL COMMUNICATION CONTROL SYSTEM, FREE-SPACE OPTICAL COMMUNICATION CONTROL APPARATUS, AND FREE-SPACE OPTICAL COMMUNICATION CONTROL METHOD

(71) Applicant: NEC Corporation, Tokyo (JP)

(72) Inventors: Koya Takata, Tokyo (JP); Atsushi Kamoi, Tokyo (JP); Hisashi Mizumoto, Tokyo (JP); Masaki Aizono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 249 days.

(21) Appl. No.: 18/222,415

(22) Filed: Jul. 14, 2023

(65) Prior Publication Data

US 2024/0097787 A1 Mar. 21, 2024

(30) Foreign Application Priority Data

Sep. 20, 2022 (JP) .................................. 2022-149250

(51) Int. Cl.
*H04B 10/00* (2013.01)
*H04B 10/079* (2013.01)
*H04B 10/112* (2013.01)

(52) U.S. Cl.
CPC ..... *H04B 10/1123* (2013.01); *H04B 10/0791* (2013.01)

(58) Field of Classification Search
CPC ... H04B 10/11; H04B 10/112; H04B 10/1121; H04B 10/1123; H04B 10/1125; H04B 10/1127; H04B 10/1129; H04B 10/114; H04B 10/1143; H04B 10/1149; H04B 10/116; H04B 10/118; H04B 10/40; H04B 10/0791; H04B 10/0795; H04B 10/07953; H04B 10/29
USPC ....... 398/118, 119, 120, 121, 122, 123, 124, 398/125, 126, 127, 128, 129, 130, 131, 398/158, 159, 33, 38, 135, 136, 172, 25, 398/26, 27, 45, 46, 47, 48, 49
See application file for complete search history.

(56) References Cited

U.S. PATENT DOCUMENTS

| 2021/0075509 A1* | 3/2021 | Draaijer | H04B 10/118 |
| 2023/0254038 A1* | 8/2023 | Karri | H04B 10/116 |
| | | | 398/131 |

FOREIGN PATENT DOCUMENTS

| JP | 2004-304248 A | 10/2004 |
| JP | 2006-094216 A | 4/2006 |
| JP | 2021-047818 A | 3/2021 |
| JP | 2021-129235 A | 9/2021 |

* cited by examiner

*Primary Examiner* — Hanh Phan
(74) *Attorney, Agent, or Firm* — Sughrue Mion, PLLC

(57) ABSTRACT

A free-space optical communication control system includes at least one processor. The at least one processor carries out: an interruption estimation process of estimating an interruption of free-space optical communication over a free-space optical communication network in accordance with movement route information that indicates a movement route of a mobile object movable within a communication area of the free-space optical communication network; and a path change process of changing a free-space optical communication path in accordance with an estimation result of the interruption estimation process.

11 Claims, 12 Drawing Sheets

FIG. 8

```
      TIME INFORMATION
10:00:00  56a DEPARTURE
 10:05:00 56b ARRIVAL
10:05:00  56b DEPARTURE
 10:10:00 56c ARRIVAL
10:10:00  56c DEPARTURE
 10:15:00 56d ARRIVAL
10:35:00  56d DEPARTURE
 10:40:00 56c ARRIVAL
10:40:00  56c DEPARTURE
 10:45:00 56b ARRIVAL
10:45:00  56b DEPARTURE
 10:50:00 56a ARRIVAL
            .
            .
            .
```

FREE-SPACE OPTICAL COMMUNICATION CONTROL SYSTEM, FREE-SPACE OPTICAL COMMUNICATION CONTROL APPARATUS, AND FREE-SPACE OPTICAL COMMUNICATION CONTROL METHOD

This Nonprovisional application claims priority under 35 U.S.C. § 119 on Patent Application No. 2022-149250 filed in Japan on Sep. 20, 2022, the entire contents of which are hereby incorporated by reference.

TECHNICAL FIELD

The present invention relates to a free-space optical communication control system, a free-space optical communication control apparatus, and a free-space optical communication control method.

BACKGROUND ART

Free-space optical communication (optical wireless communication), which is communication carried out with use of light propagating through space, is interrupted when there is a physical object on the path of the light. In order for such an interruption of communication to be avoided, for example, Patent Literature 1 discloses the following technique: an unmanned aircraft detects a physical object present in the environment to share, with another unmanned aircraft, physical object information that contains information on the position of the physical object, by optical wireless communication or radio communication. In accordance with the shared information, the movement of the unmanned aircraft is restricted such that the physical object is not located on the optical axis of optical wireless communication carried out between the unmanned aircraft and the other unmanned aircraft.

CITATION LIST

[Patent Literature]
[Patent Literature 1] Japanese Patent Application Publication, Tokukai, No. 2021-047818

SUMMARY OF INVENTION

Technical Problem

However, the technique of Patent Literature 1 cannot be applied in a case where the movement route of the unmanned aircraft is determined in advance.

An example object of the present invention is to provide a free-space optical communication control system, a free-space optical communication control apparatus, and a free-space optical communication control method that are capable of preventing an interruption of free-space optical communication caused by movement of a mobile object the movement route of which is predetermined.

Solution to Problem

An example aspect of a free-space optical communication control system of the present invention includes at least one processor, the at least one processor carrying out: an interruption estimation process of estimating an interruption of free-space optical communication over a free-space optical communication network in accordance with movement route information that indicates a movement route of a mobile object movable within a communication area of the free-space optical communication network; and a path change process of changing a path of the free-space optical communication in accordance with an estimation result of the interruption estimation process.

An example aspect of a free-space optical communication control apparatus of the present invention includes at least one processor, the at least one processor carrying out: an interruption estimation process of estimating an interruption of free-space optical communication over a free-space optical communication network in accordance with movement route information that indicates a movement route of a mobile object movable within a communication area of the free-space optical communication network; and a path change process of changing a path of the free-space optical communication in accordance with an estimation result of the interruption estimation process.

An example aspect of a free-space optical communication control method of the present invention includes: estimating an interruption of free-space optical communication over a free-space optical communication network in accordance with movement route information that indicates a movement route of a mobile object movable within a communication area of the free-space optical communication network; and changing a path of the free-space optical communication in accordance with an estimation result of estimating the interruption of free-space optical communication.

Advantageous Effects of Invention

It is possible to avoid an interruption of free-space optical communication caused by movement of a mobile object the movement route of which is predetermined.

BRIEF DESCRIPTION OF DRAWINGS

FIG. 8 is diagram of an example of the information used by the free-space optical communication control system in accordance with the second example embodiment.

EXAMPLE EMBODIMENTS

First Example Embodiment (Free-Space Optical Communication Control System)

The following description will discuss a free-space optical communication control system 100 in accordance with a first example embodiment of the present invention, with reference to the drawings. The free-space optical communication control system 100 is a system that controls an optical communication path over a free-space optical communication network. The free-space optical communication network is a network which is formed by a plurality of free-space optical communication apparatuses and over which free-space optical communication is carried out via the free-space optical communication paths set between the free-space optical communication apparatuses.

Free-space optical communication is communication that is carried out with use of light propagating through space. Examples of the light used in free-space optical communication can include a millimeter wave, a submillimeter wave, infrared light, visible light, and ultraviolet light. To set a free-space optical communication path between two free-space optical communication apparatuses, it is necessary to carry out, between the two free-space optical communication apparatuses, optical axis alignment for free-space optical communication. The alignment for free-space optical communication refers to aligning the optical axis of a light sending and receiving section of one of the free-space optical communication apparatuses with the optical axis of a light sending and receiving section of the other.

Figure 1:
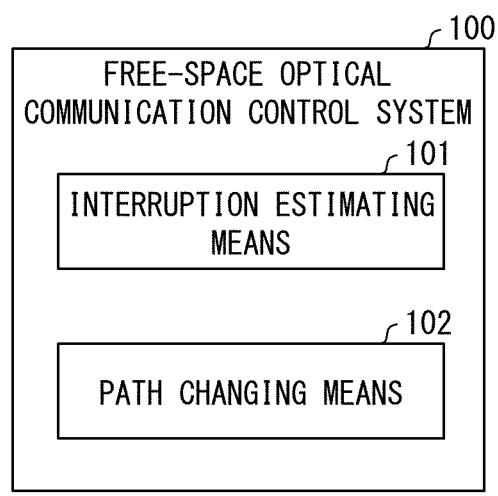
FIG. 1 is a block diagram of an example configuration of a free-space optical communication control system in accordance with a first example embodiment.

FIG. 1 is a functional block diagram of an example configuration of the free-space optical communication control system 100 in accordance with the first example embodiment of the present invention. In FIG. 1, each of the blocks indicates a function-by-function component. Accordingly, the blocks illustrated in FIG. 1 may be implemented in a single apparatus, or may be implemented in more than one apparatus. Further, some or all of the blocks may be implemented as functions with use of the cloud or the like. The free-space optical communication control system 100 includes an interruption estimating means 101 and a path changing means 102.

Figure 2:
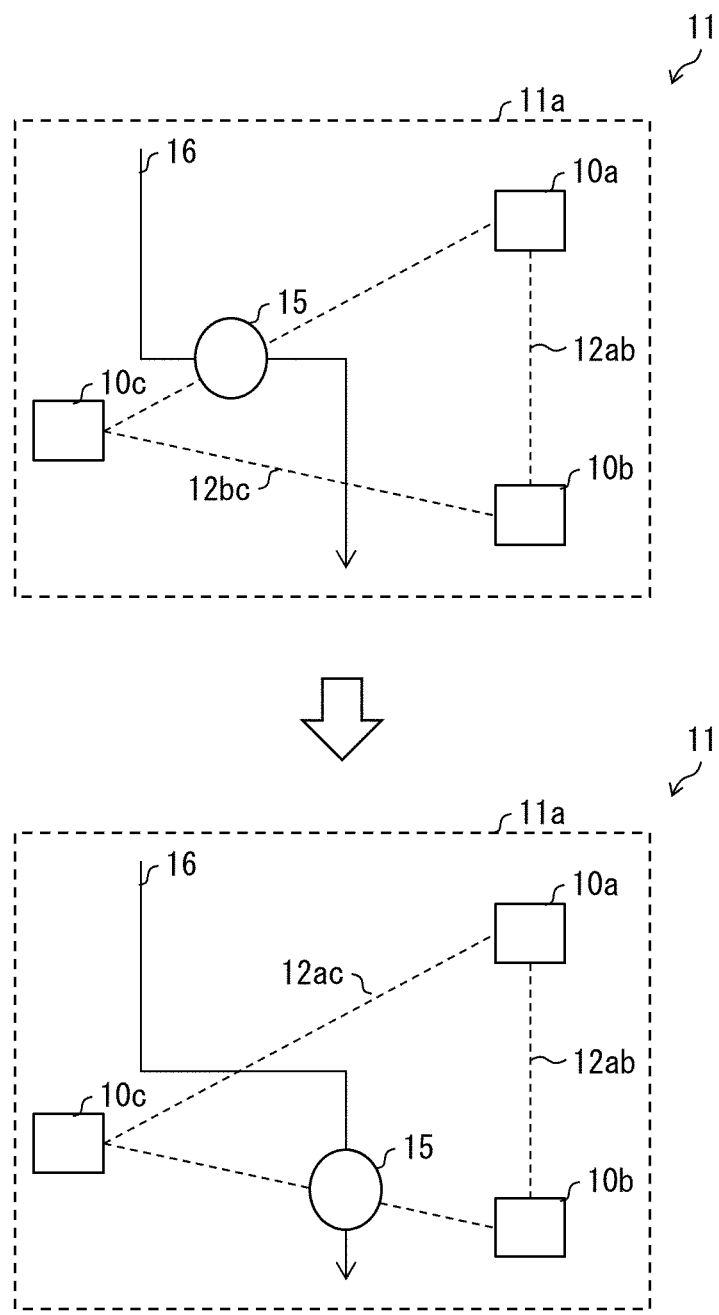
FIG. 2 is a diagram of an example configuration of a free-space optical communication network 11 in the first example embodiment.

The free-space optical communication control system 100 is connected to a free-space optical communication network 11. FIG. 2 is a diagram of an example configuration of the free-space optical communication network 11. Illustrated in the upper part of FIG. 2 is an example of the free-space optical communication network 11. Illustrated in the lower part of FIG. 2 is an example which is the example of the upper part after a lapse of time. The free-space optical communication network 11 is formed by free-space optical communication apparatuses 10a, 10b, and 10c. The free-space optical communication apparatuses 10a, 10b, and 10c can be referred to collectively as free-space optical communication apparatuses 10.

The free-space optical communication apparatus 10a and the free-space optical communication apparatus 10b are connected to each other via a free-space optical communication path 12ab. The free-space optical communication apparatus 10b and the free-space optical communication apparatus 10c are connected to each other via a free-space optical communication path 12bc. The free-space optical communication path 12ab, the free-space optical communication path 12bc, and any other free-space optical communication path among the free-space optical communication apparatuses 10 can be referred to collectively as free-space optical communication paths 12.

In the free-space optical communication network 11, a communication area 11a is predetermined. The communication area 11a of the free-space optical communication network 11 refers to an area in which free-space optical communication over the free-space optical communication network 11 can be carried out and which contains all the free-space optical communication apparatuses 10 forming the free-space optical communication network 11.

In the communication area 11a, a mobile object 15 shall move along a movement route 16. The mobile object 15 is not limited to any particular physical object provided that the physical object is movable within the communication area 11a. Examples of the mobile object 15 include a crane, a backhoe, a forklift, a bulldozer, a truck, and an automated guided vehicle (AGV). The movement route 16 is a route along which the mobile object 15 moves. For example, the movement route 16 may be a road or a direction along which the mobile object 15 is mobile within the communication area 11a, or may be a preplanned travel route of the mobile object 15. The movement route 16 may be defined by movement route information. The movement route information is information that indicates the movement route 16 of the mobile object 15. For example, the movement route information may be a map indicating a movement route, or may be a group of coordinates indicating the mobile object.

The interruption estimating means 101 estimates an interruption of free-space optical communication via the free-space optical communication paths 12 over the free-space optical communication network 11, in accordance with the movement route information that indicates the movement route 16 of the mobile object 15. Specifically, the interruption estimating means 101 estimates, in accordance with the movement route information, a position at which the mobile object 15 is located after movement, to estimate which free-space optical communication among the free-space optical communication apparatuses 10 is to be interrupted due to the position at which the mobile object 15 is estimated to be after movement. The interruption estimating means 101 may also estimate which free-space optical communication among the free-space optical communication apparatuses 10 is brought into a non-interruption state due to the position at which the mobile object 15 is estimated to be after movement.

For example, the mobile object 15 at the position illustrated in a diagram in the upper part of FIG. 2 is located between the free-space optical communication apparatus 10a and the free-space optical communication apparatus 10c. Thus, the mobile object 15 is interrupting free-space optical communication between the free-space optical communication apparatus 10a and the free-space optical communication apparatus 10c, but does not interrupt free-space optical communication between the free-space optical communication apparatus 10b and free-space optical communication apparatus 10c.

In contrast, the mobile object 15 at the position illustrated in a diagram in the lower part of FIG. 2 is located between the free-space optical communication apparatus 10b and the free-space optical communication apparatus 10c. Thus, the mobile object 15 is interrupting free-space optical communication between the free-space optical communication apparatus 10b and the free-space optical communication apparatus 10c, but does not interrupt free-space optical communication between the free-space optical communication apparatus 10a and free-space optical communication apparatus 10c.

The interruption estimating means 101 estimates, in accordance with the movement route information, that movement of the mobile object 15 from the position illustrated in the diagram in the upper part of FIG. 2 to the position illustrated in the lower part of FIG. 2 interrupts free-space optical communication via the free-space optical communication path 12bc between the free-space optical communication apparatus 10b and the free-space optical communication apparatus 10c. The interruption estimating means 101 may also estimate, in accordance with the movement route information, that movement of the mobile object 15 from the position illustrated in the diagram in the upper part of FIG. 2 to the position illustrated in the lower part of FIG. 2 brings free-space optical communication between the free-space optical communication apparatus 10a and the free-space optical communication apparatus 10c into a non-interruption state, to allow free-space optical communication via the free-space optical communication path 12ac.

The path changing means 102 changes the free-space optical communication paths 12 in accordance with the estimation result provided by the interruption estimating means 101. For example, the path changing means 102 may stop the communication via the free-space optical communication path 12 that is estimated to be interrupted and establish a new free-space optical communication path 12 that connects the starting point and the ending point of the free-space optical communication path 12 the communication via which has been stopped. In this establishment, the path changing means 102 may establish the above new free-space optical communication path 12 by communication via the free-space optical communication path 12 that contains an optical path estimated to have been brought into a non-interruption state.

For example, in a case where the interruption estimating means 101 estimates that movement of the mobile object 15 from the position illustrated in the diagram in the upper part of FIG. 2 to the position illustrated in the lower part of FIG. 2 interrupts free-space optical communication via the free-space optical communication path 12bc between the free-space optical communication apparatus 10b and the free-space optical communication apparatus 10c, the interruption estimating means 101 may stop free-space optical communication from being carried out via the free-space optical communication path 12bc, via which free-space optical communication is to be interrupted. The interruption estimating means 101 may then establish a free-space optical communication path which serves as an alternative to the free-space optical communication path 12, which is formed by the free-space optical communication path 12ab and the free-space optical communication path 12ac, and which serves as a new free-space optical communication path connecting the free-space optical communication apparatus 10b and the free-space optical communication apparatus 10c that are respectively the starting point and the ending point of the free-space optical communication path 12bc.

With the above configuration, it is possible for the free-space optical communication control system 100 to avoid an interruption of free-space optical communication caused by movement of a mobile object the movement route of which is predetermined so as to be within the communication area 11a of the free-space optical communication network 11.

(Free-Space Optical Communication Control Method)

Figure 3:
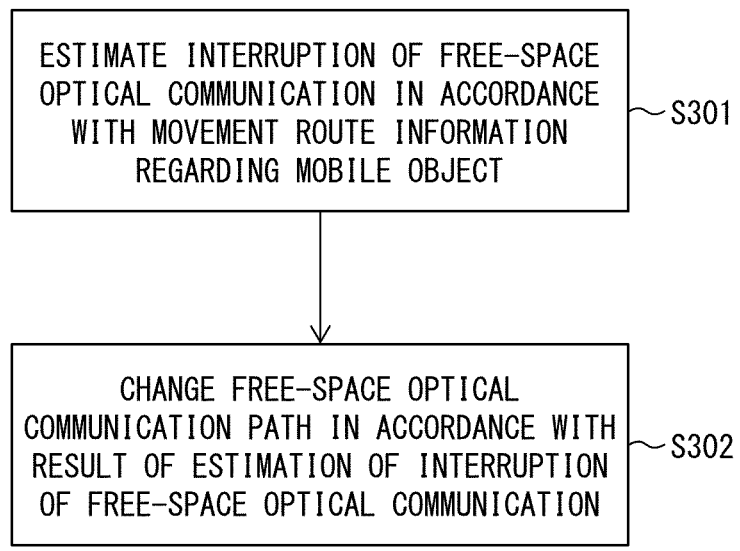
FIG. 3 is a flowchart of an example operation of a free-space optical communication control system in accordance with the first example embodiment.

The operation (free-space optical communication control method) of the free-space optical communication control system in accordance with the first example embodiment will be described with use of the drawings. FIG. 3 is a flowchart of an example operation of the free-space optical communication control system 100.

In step S301, the interruption estimating means 101 estimates an interruption of free-space optical communication via the free-space optical communication path 12 over the free-space optical communication network 11, in accordance with the movement route information that indicates the movement route 16 of the mobile object 15 movable within the communication area 11a of the free-space optical communication network 11.

In step S302, the path changing means 102 changes the free-space optical communication path 12 in accordance with a result of estimation carried out by the interruption estimating means 101 in step S301.

(Free-Space Optical Communication Control Apparatus)

Figure 4:
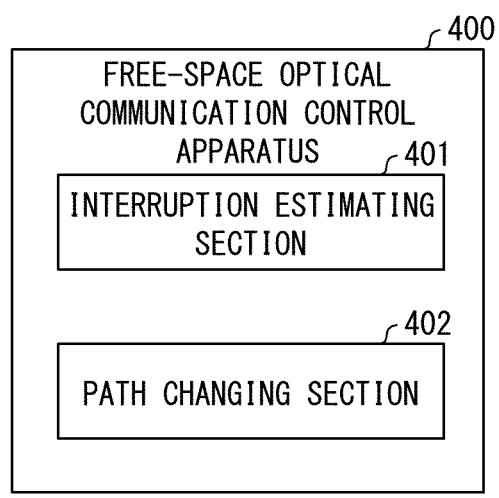
FIG. 4 is a block diagram of an example configuration of a free-space optical communication control apparatus in accordance with the first example embodiment.

FIG. 4 is a block diagram of an example configuration of a free-space optical communication control apparatus 400 in accordance with the first example embodiment of the present invention. An interruption estimating section 401 has a function equivalent to that of the interruption estimating means 101, and estimates an interruption of free-space optical communication via the free-space optical communication path 12 in the free-space optical communication network 11, in accordance with the movement route information that indicates the movement route 16 of the mobile object 15 movable within the communication area 11a of the free-space optical communication network 11. A path changing section 402 has a function equivalent to that of the path changing means 102, and changes the free-space optical communication path 12 in accordance with a result of estimation carried out by the interruption estimating section 401.

Each of the interruption estimating section 401 and the path changing section 402 may be computer equipment in which a processor executes a program stored in a memory so that a process is carried out. Each of the interruption estimating section 401 and the path changing section 402 may be partially or wholly included in the free-space optical communication apparatuses 10, or may be computer equipment that communicates with the free-space optical communication apparatuses 10. For example, the interruption estimating section 401 and the path changing section 402 may be provided by a single piece of computer equipment, or may be provided by a computer equipment group that operates through collaboration among pieces of computer equipment or by a server equipment group that operates through collaboration among pieces of server equipment. With the free-space optical communication control apparatus 400, it is possible to obtain an example advantage equivalent to the example advantage of the free-space optical communication control system 100.

Second Example Embodiment

A free-space optical communication control system 500 in accordance with a second example embodiment will be described. The same reference sign is assigned to a component that has the same function as the component described in the first example embodiment, and the description thereof is omitted.

Figure 5:
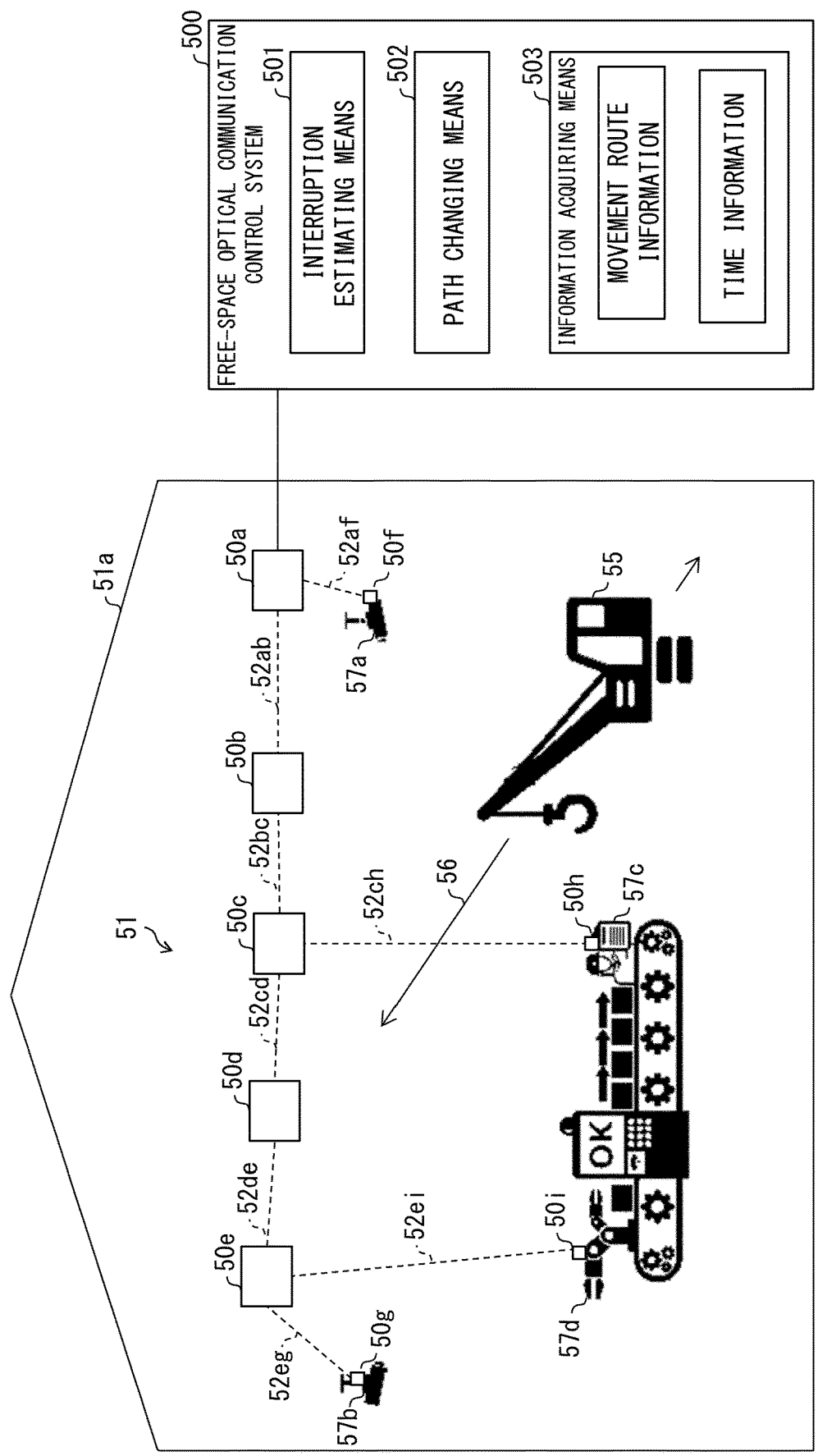
FIG. 5 is a block diagram of an example configuration of a free-space optical communication control system in accordance with a second example embodiment.

FIG. 5 is a block diagram of an example configuration of the free-space optical communication control system 500 in accordance with the second example embodiment of the present invention. In FIG. 5, each of the blocks indicates a function-by-function component. Accordingly, the blocks illustrated in FIG. may be implemented in a single apparatus, or may be implemented in more than one apparatus. Further, some or all of the blocks may be implemented as functions with use of the cloud or the like. As illustrated in FIG. 5, the free-space optical communication control system 500 includes an interruption estimating means 501, a path changing means 502, and an information acquiring means 503.

Figure 6:
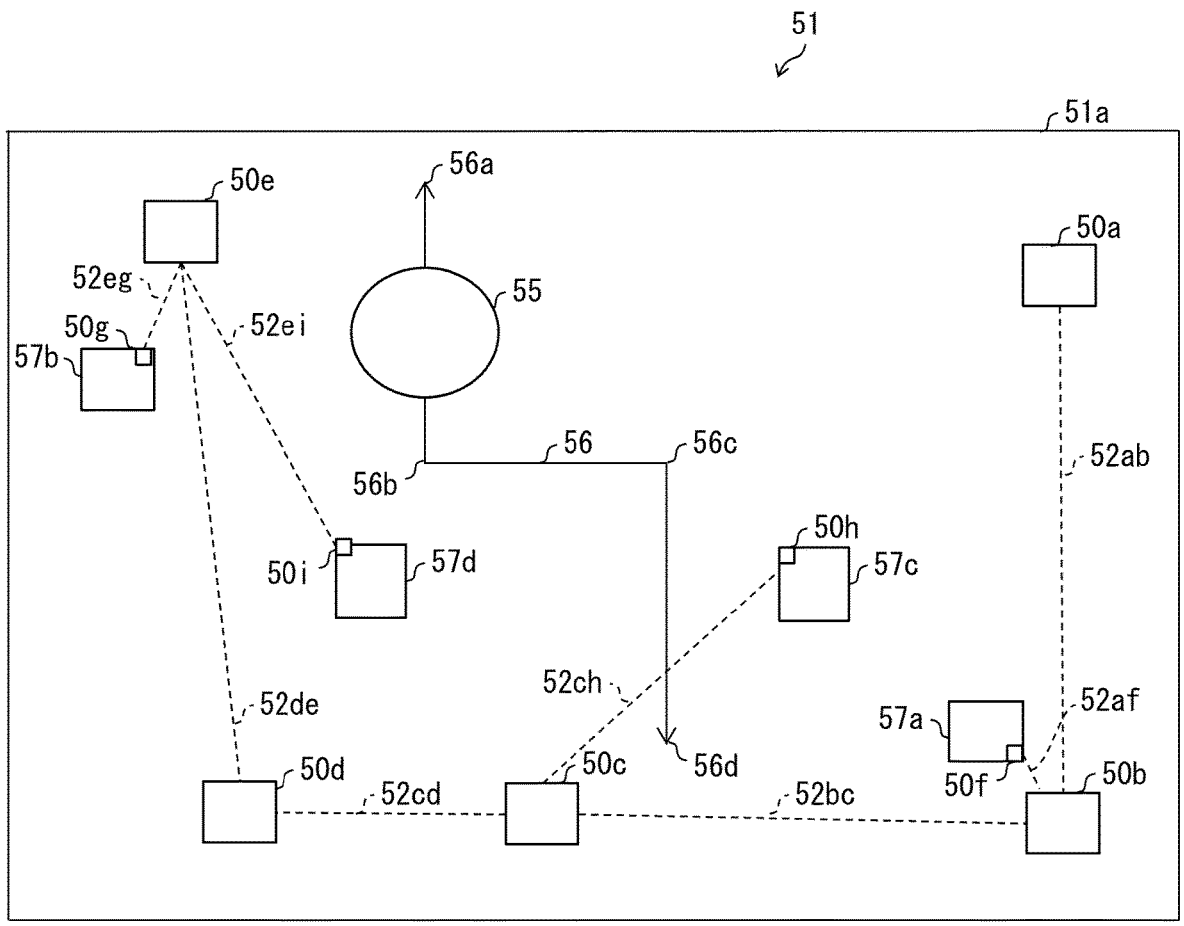
FIG. 6 is a diagram of an example configuration in the inside of a communication area of a free-space optical communication network controlled by the free-space optical communication control system in accordance with the second example embodiment.

The free-space optical communication control system 500 is connected to a free-space optical communication network 51. FIG. 6 is a diagram of an example configuration of the free-space optical communication network 51. The free-space optical communication network 51 is formed by free-space optical communication apparatuses 50a, 50b, 50c, 50d, 50e, 50f, 50g, 50h, and 50i. The free-space optical communication apparatuses 50a, 50b, 50c, 50d, 50e, 50f, 50g, 50h, and 50i can be referred to collectively as free-space optical communication apparatuses 50.

The free-space optical communication apparatus 50a and the free-space optical communication apparatus 50b are connected to each other via a free-space optical communication path 52ab. The free-space optical communication apparatus 50b and the free-space optical communication apparatus 50c are connected to each other via a free-space optical communication path 52bc. Similarly, a free-space optical communication path that connects a free-space optical communication apparatus 50x and a free-space optical communication apparatus 50y will be referred to as a free-space optical communication path 52xy. The free-space optical communication path 52ab, the free-space optical communication path 52bc, and the other free-space optical communication paths among the free-space optical communication apparatuses 50 can be referred to collectively as free-space optical communication paths 52.

In the free-space optical communication network 51, a communication area 51a is set. The communication area 51a of the free-space optical communication network 51 refers to an area in which free-space optical communication over the free-space optical communication network 11 can be carried out and which contains all the free-space optical communication apparatuses 10 forming the free-space optical communication network 11. In the following description, an example in which the communication area 51a is the inside of the premises of a factory will be described, but the present example embodiment is not limited thereto.

Located within the communication area 51a are: a mobile object 55 which is heavy equipment such as a crane car, a backhoe, a forklift, or a bulldozer; cameras 57a and 57b for taking an image of the inside of the factory; a tablet terminal 57c used by a person working in the factory; robotic equipment 57d; etc. However, the mobile object 55 is not necessarily limited to a large apparatus such as heavy equipment, but includes various movable apparatuses such as a truck and an AGV. This is because the width of an optical path used in free-space optical communication is typically very narrow, and even compact equipment can be therefore sufficient for an interruption of free-space optical communication carried out via the free-space optical communication path. The mobile object 55 moves along a movement route 56 within the communication area 51a.

The free-space optical communication apparatus 50f is provided in the camera 57a to transmit and receive data of an image taken by the camera 57a. The free-space optical communication apparatus 50g is provided in the camera 57b to transmit and receive data of an image taken by the camera 57b. The free-space optical communication apparatus 50h is provided in the tablet terminal 57c so that the tablet terminal 57c transmits and receives data. The free-space optical communication apparatus 50i is provided in the robotic equipment 57d so that the robotic equipment 57d transmits and receives a control signal.

The information acquiring means 503 includes, for example, storage for storing information, and stores movement route information and time information. This enables the information acquiring means 503 to acquire the movement route information and the time information and provide the interruption estimating means 501 and the path changing means 502 with the movement route information and the time information. The information acquiring means 503 may have a configuration so as to access an external database that stores movement route information and time information, acquire the movement route information and the time information, and provide the interruption estimating means 501 and the path changing means 502 with the movement route information and the time information.

Figure 7:
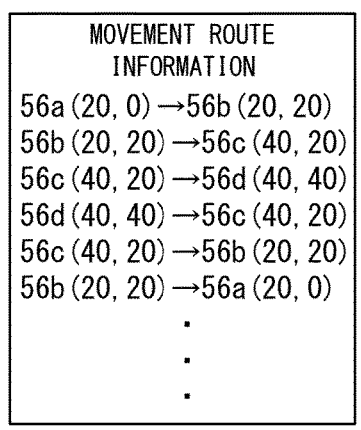
FIG. 7 is a diagram of an example of information used by the free-space optical communication control system in accordance with the second example embodiment.

The movement route information is information that indicates a movement route that is a path along which the mobile object 55 moves within the communication area 51a. FIG. 7 is a diagram of an example of the movement route information. FIG. 7 shows a movement route by which the mobile object 55 leaves a point 56a and passes through points 56b and 56c to reach a point 56d, and subsequently leaves the point 56d and passes through the points 56b and 56c to return to the point 56a.

The time information is information that indicates a scheduled time (schedule) of movement of the mobile object 55. FIG. 8 is a diagram of an example of the time information. FIG. 8 shows a time of departure from each of the points of a movement route and a time of arrival at the next point, the movement route being such that leaving the point 56a and passing through the points 56b and 56c to reach the point 56d, and subsequently leaving the point 56d and passing through the points 56b and 56c to return to the point 56a.

The interruption estimating means 501 estimates an interruption of free-space optical communication via the free-space optical communication paths 52 over the free-space optical communication network 51, in accordance with the movement route information that indicates the movement route 56 of the mobile object 55 and the time information that indicates the scheduled time of movement of the mobile object 55.

The interruption estimating means 501 then estimates an interruption of free-space optical communication via the free-space optical communication paths 52 by determining, in accordance with the movement route information and time information, whether the mobile object 55 is to move to any place on the free-space optical communication paths 52.

This means that the interruption estimating means 501 can estimate, in accordance with the movement route information and the time information, a position to which the mobile object 55 is moving. Therefore, the interruption estimating means 501 can determine whether the estimated position after movement is on the free-space optical communication paths 52, to estimate: whether free-space optical communication via the free-space optical communication paths 52 is interrupted; and in a case where free-space optical communication is interrupted, via which of the free-space optical communication paths 52 free-space optical communication is interrupted.

In the example illustrated in FIG. 6, the interruption estimating means 501 can estimate that free-space optical communication carried out via the free-space optical communication path 52ch is interrupted while the mobile object 55 is moving between the point 56c and the point 56d. The interruption estimating means 501 may, for example, estimate an interruption that can occur during the first coming predetermined period of time, or may estimate all interruptions that may occur in the future.

Like the interruption estimating means 101 in the first example embodiment, the interruption estimating means 501 may also estimate that any free-space optical communication has been brought into a non-interruption state.

The path changing means 502 then changes the free-space optical communication paths 52 in accordance with the estimation result provided by the interruption estimating means 501. For example, the path changing means 502 may stop the free-space optical communication via the free-space optical communication path 52 that is estimated to be interrupted and establish a new free-space optical communication path 52 that connects the starting point and the ending point of the free-space optical communication path 52 the free-space optical communication via which has been stopped. In this establishment, the path changing means 502 may establish the above new free-space optical communication path 52 by allowing free-space optical communication that is carried out via the free-space optical communication path 52 that is estimated to have been brought into a non-interruption state.

In the example illustrated in FIG. 6, the path changing means 502 may stop free-space optical communication via the free-space optical communication path 52ch while the mobile object 55 is moving between the point 56c and the point 56d, and may establish, for example, the free-space optical communication path 52bh instead.

With the above configuration, it is possible for the free-space optical communication control system 500 to avoid an interruption of free-space optical communication caused by movement of a mobile object the movement route of which is predetermined so as to be within the communication area 51a of the free-space optical communication network 51.

In the above description, the second example embodiment has been described as the free-space optical communication control system 500. The free-space optical communication control system 500 in accordance with the second example embodiment may be incorporated into a single apparatus to form a free-space optical communication control apparatus. The free-space optical communication control method in accordance with the second example embodiment may be the operation of the free-space optical communication control system 500 in accordance with the second example embodiment.

Third Example Embodiment

A free-space optical communication control system 900 in accordance with a third example embodiment will be described. The same reference sign is assigned to a component that has the same function as the component described in the first or second example embodiments, and the description thereof is omitted.

Figure 9:
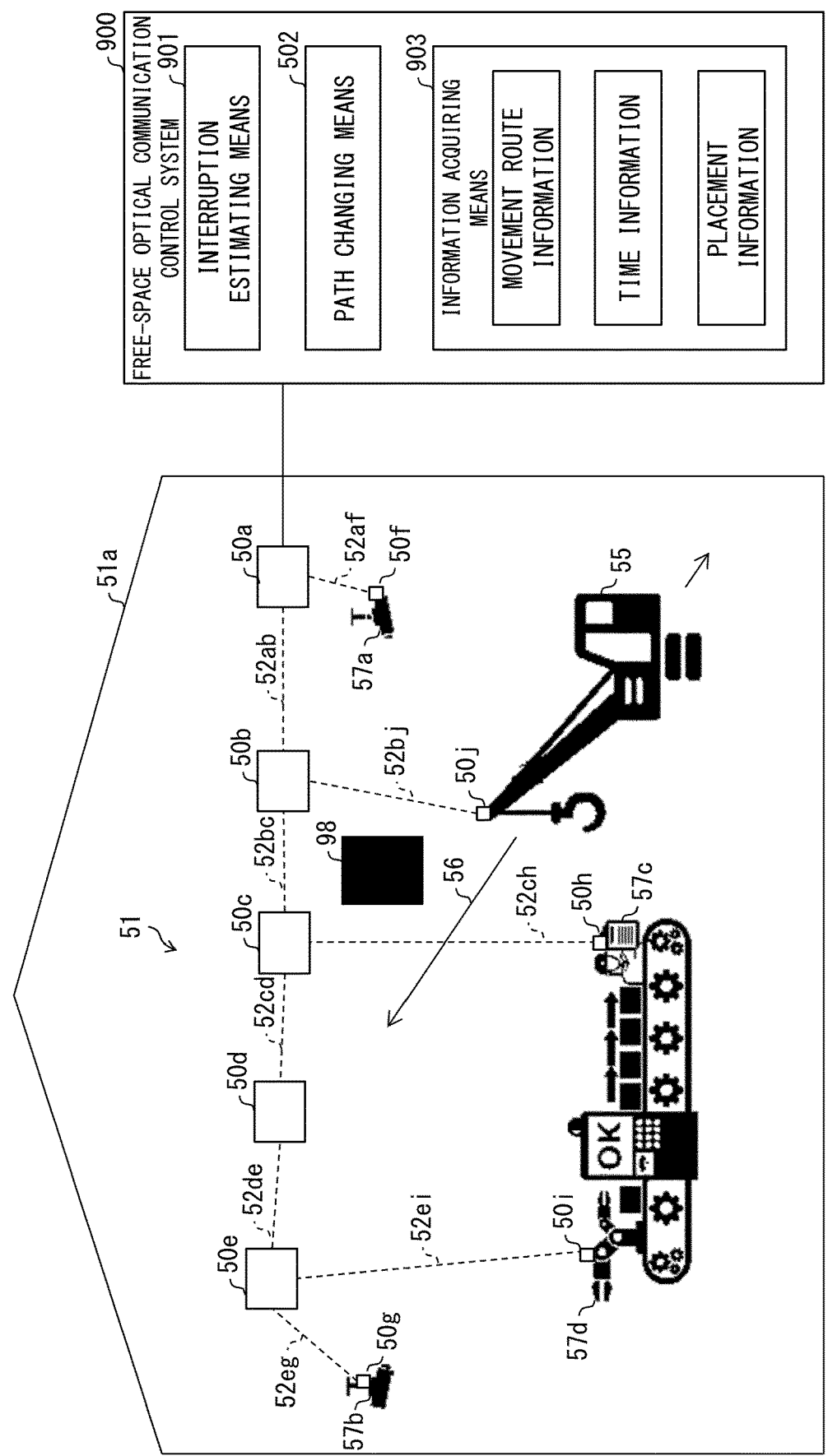
FIG. 9 is a block diagram of an example configuration of a free-space optical communication control system in accordance with a third example embodiment.

FIG. 9 is a block diagram of an example configuration of the free-space optical communication control system 900 in accordance with the third example embodiment of the present invention. In FIG. 9, each of the blocks indicates a function-by-function component. Accordingly, the blocks illustrated in FIG. 9 may be implemented in a single apparatus, or may be implemented in more than one apparatus. Further, some or all of the blocks may be implemented as functions with use of the cloud or the like. As illustrated in FIG. 9, the free-space optical communication control system 900 includes an interruption estimating means 901, a path changing means 502, and an information acquiring means 903.

Figure 10:
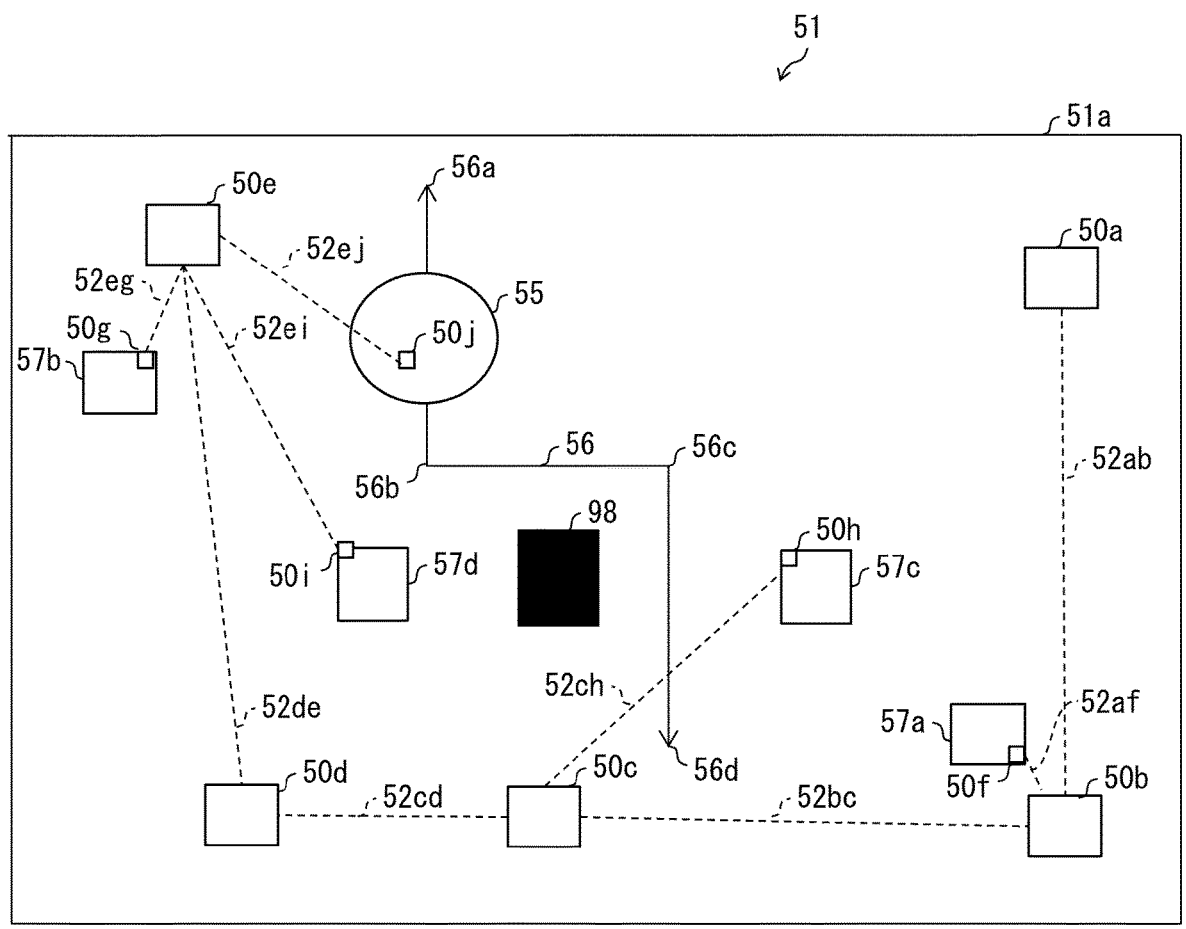
FIG. 10 is a diagram of an example of a free-space optical communication network controlled by the free-space optical communication control system in accordance with the third example embodiment.
Figure 11:
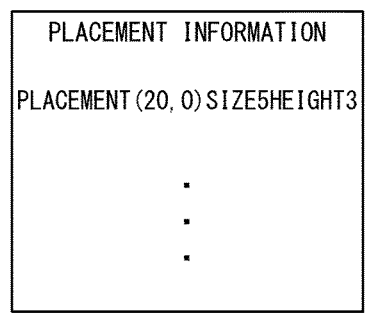
FIG. 11 is a diagram of an example of information used by the free-space optical communication control system in accordance with the third example embodiment.

The free-space optical communication control system 900 is connected to the free-space optical communication network 51. FIG. 10 is a diagram of an example configuration of the free-space optical communication network 51 in the third example embodiment. The configuration of the free-space optical communication network 51 is the same as that in the second example embodiment, except the following respect. Specifically, the mobile object 55 includes a free-space optical communication apparatus 50j contained in the free-space optical communication network 51, in order to transmit and receive data regarding the mobile object 55. Examples of the data regarding the mobile object 55 include movement route information, time information, and information for controlling the mobile object. Examples of the information for controlling the mobile object include the movement speed, the rotation speed, the posture, the movement schedule, etc. of the mobile object. More specifically, the examples include the rotation speed, the turning angle, etc. of a wheel that provide the movement speed, the rotation speed, the posture, the movement schedule, etc. of the mobile object. Further, in the communication area 51a, a physical object 98 is disposed. The physical object 98 includes a physical object that could interrupt free-space optical communication via the free-space optical communication paths 52. Examples of such a physical object include, but not limited to, a wall, a shelf, a shipping item, a desk, various pieces of equipment, and a pillar.

The information acquiring means 903 includes, for example, storage for storing information, and stores movement route information, time information, and placement information. This enables the information acquiring means 903 to acquire the movement route information, the time information, and the placement information, and provide the interruption estimating means 901 and the path changing means 502 with the movement route information. The information acquiring means 903 may have a configuration so as to access an external database that stores movement route information, time information, and placement information, acquire the movement route information, the time information, and the placement information, and provide the interruption estimating means 901 and the path changing means 502 with the movement route information, the time information, and the placement information.

The placement information is information that indicates the physical object 98 placed within the communication area 51a. The phrase "a physical object placed within the communication area 51a" means that the physical object is fixed, or stays within a certain range even if it moves. FIG. 10 is a diagram of an example of placement information. FIG. 10 shows the position at which the physical object 98 is placed, the horizontal size of the physical object 98, and the vertical height of the physical object 98.

The placement acquired by the information acquiring means 903 may be information that is inputted in advance, but at least part of the placement information may be generated by the information acquiring means 903. Specifically, the information acquiring means (generating means) 903 may generate placement information in accordance with an image that represents the inside of the communication area 51a. The information acquiring means 903 may use a known technique for detecting, in accordance with a taken image, the position and the size of a physical object present in the image-taking area, to generate the placement information. The image representing the inside of the communication area 51a may be an image taken by the cameras 57a and 57b, which are image-taking means for taking an image of the inside of the communication area 51a. Alternatively, the image representing the inside of the communication area 51a may be an image externally inputted to the information acquiring means 903. In addition, the cameras 57a and 57b may be capable of acquiring depth information so that the information acquiring means 903 can more accurately generate the placement information.

By the information acquiring means 903 generating the placement information in accordance with the taken image, it is possible to cope with a change in placement state of the physical object 98 within the communication area 51a. For example, a shelf, a shipping item, etc. may be moved or taken out depending on the time. Even in such a case, the information acquiring means 903 is capable of providing accurate placement information.

The interruption estimating means 901 estimates an interruption of free-space optical communication via the free-space optical communication paths 52 over the free-space optical communication network 51 in accordance with: movement route information that indicates a movement route 56 of the mobile object 55; time information that indicates a scheduled time of movement of the mobile object 55; and placement information that indicates the physical object 98 placed within communication area 51a.

Like the interruption estimating means 501 in the second example embodiment, the interruption estimating means 901 can estimate, in accordance with the movement route information and the time information, a position to which the mobile object 55 is moving. The interruption estimating means 901 then estimates an interruption of free-space optical communication via the free-space optical communication paths 52, by determining whether a physical object indicated by the placement information interrupts free-space optical communication carried out via a path that is included in the free-space optical communication paths 52 and that is between apparatuses one of which is the free-space optical communication apparatus 50j provided in the mobile object 55.

In the example illustrated in FIG. 10, the interruption estimating means 901 may estimate that: while the mobile object 55 is moving between the point 56a and the point 56c, free-space optical communication via the free-space optical communication path 52ej is not interrupted between the free-space optical communication apparatus 50j and the free-space optical communication apparatus 50e, but while the mobile object 55 is moving between the point 56c and the point 56d, free-space optical communication via the free-space optical communication path 52ej is interrupted. The interruption estimating means 501 may, for example, estimate an interruption that can occur during the first coming predetermined period of time, or may estimate all interruptions that may occur in the future.

Like the interruption estimating means 101 in the first example embodiment, the interruption estimating means 901 may also estimate that any free-space optical communication has been brought into a non-interruption state.

The path changing means 502 then changes the free-space optical communication paths 52 in accordance with the estimation result provided by the interruption estimating means 901. In the example illustrated in FIG. 10, the path changing means 502 may stop free-space optical communication via the free-space optical communication path 52ej while the mobile object 55 is moving between the point 56c and the point 56d, and may establish, for example, the free-space optical communication path 52bj instead.

With the above configuration, it is possible for the free-space optical communication control system 900 to avoid an interruption of free-space optical communication caused by movement of a mobile object the movement route of which is predetermined so as to be within the communication area 51a of the free-space optical communication network 51.

In the above description, the third example embodiment has been described as the free-space optical communication control system 900. The free-space optical communication control system 900 in accordance with the third example embodiment may be incorporated into a single apparatus to form a free-space optical communication control apparatus. The free-space optical communication control method in accordance with the third example embodiment may be the operation of the free-space optical communication control system 900 in accordance with the third example embodiment.

Fourth Example Embodiment

A free-space optical communication control system 1200 in accordance with a fourth example embodiment will be described. The same reference sign is assigned to a component that has the same function as the component described in the first to third example embodiments, and the description thereof is omitted.

Figure 12:
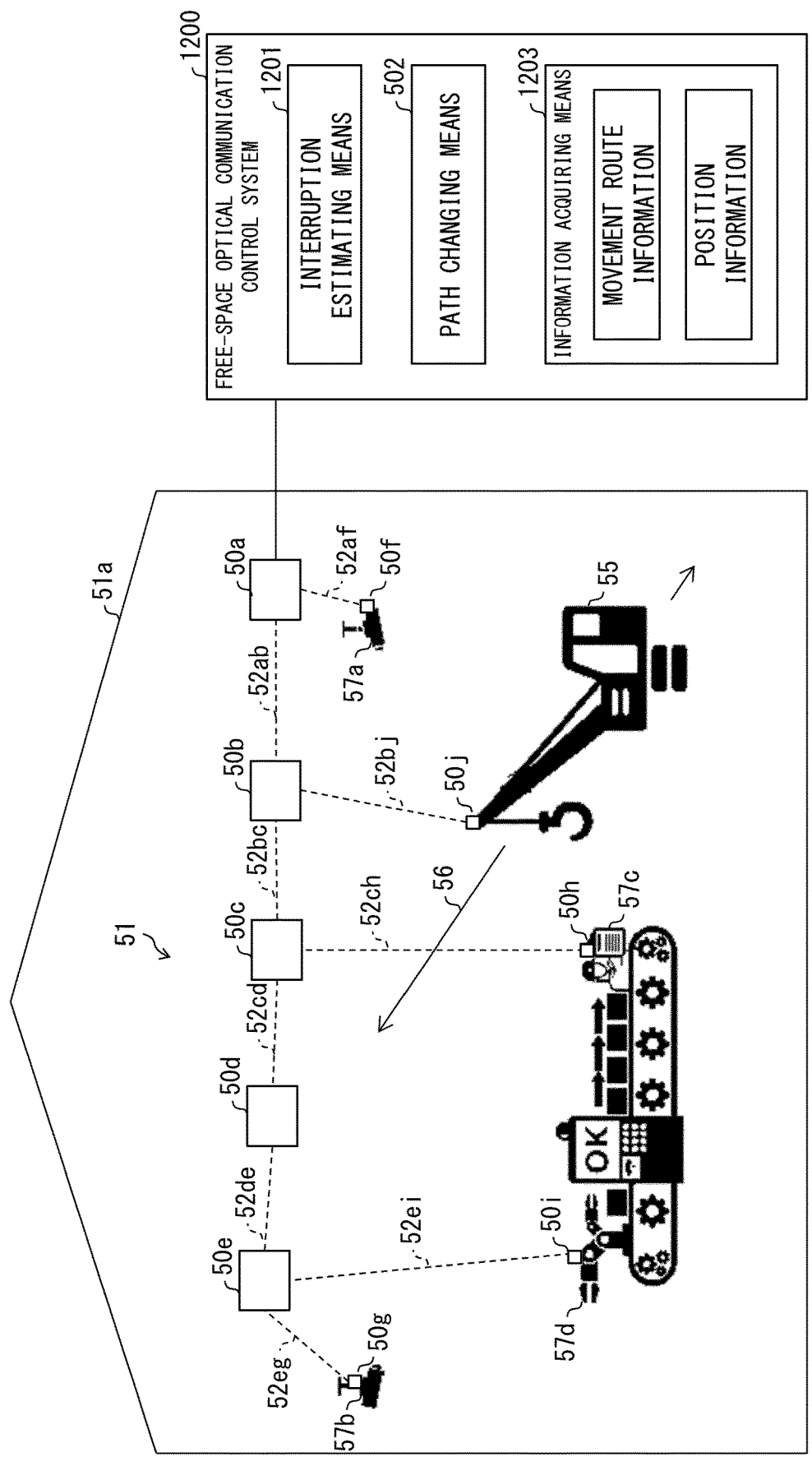
FIG. 12 is a block diagram of an example configuration of a free-space optical communication control system in accordance with a fourth example embodiment.

FIG. 12 is a block diagram of an example configuration of the free-space optical communication control system 1200 in accordance with the fourth example embodiment of the present invention. In FIG. 12, each of the blocks indicates a function-by-function component. Accordingly, the blocks illustrated in FIG. 12 may be implemented in a single apparatus, or may be implemented in more than one apparatus. Further, some or all of the blocks may be implemented as functions with use of the cloud or the like. As illustrated in FIG. 12, the free-space optical communication control system 1200 includes an interruption estimating means 1201, a path changing means 502, and an information acquiring means 1203.

The free-space optical communication control system 1200 is connected to a free-space optical communication network 51. The configuration of the free-space optical communication network 51 is the same as that in the second example embodiment. However, as in the third example embodiment, the mobile object 55 includes a free-space optical communication apparatus 50*j* that is contained in the free-space optical communication network 51.

The information acquiring means 1203 includes, for example, storage for storing information and stores movement route information. This enables the information acquiring means 1203 to acquire the movement route information and provide the interruption estimating means 1201 and the path changing means 502 with the movement route information. The information acquiring means 1203 may have a configuration so as to access an external database that stores movement route information, acquire the movement route information, and provide the interruption estimating means 1201 and the path changing means 502 with the movement route information.

The information acquiring means 1203 also acquires position information that indicates the position of the mobile object 55 and provides the interruption estimating means 1201 and the path changing means 502 with the position information. For example, in accordance with the position information regarding the free-space optical communication apparatuses 50 in the free-space optical communication network 51, the position information being based on the optical axis alignment between the free-space optical communication apparatuses 50, the information acquiring means (position acquiring means) 1203 may acquire the position information that indicates the position of the mobile object 55.

Figure 13:
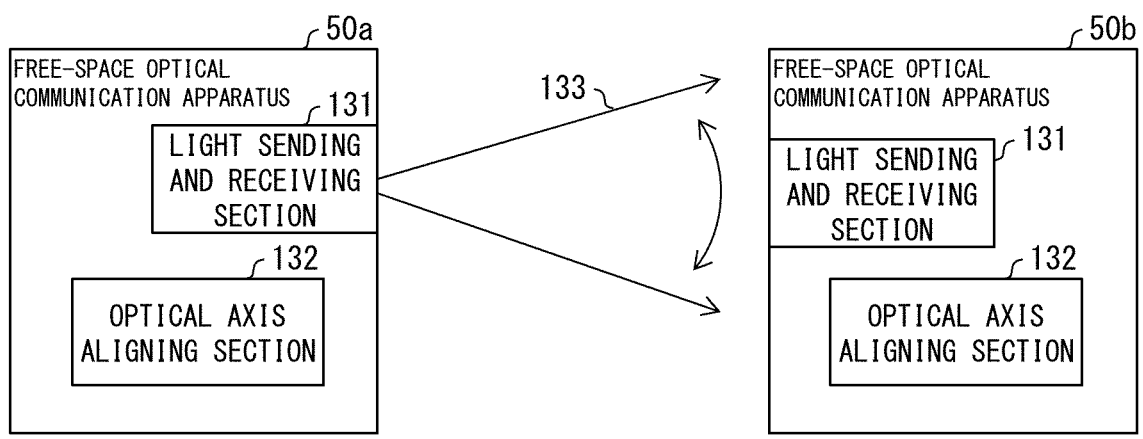
FIG. 13 is an explanatory diagram of an example of optical axis alignment carried out by free-space optical communication apparatuses.

In order to carry out free-space optical communication between the free-space optical communication apparatuses 50 in the free-space optical communication network 51, optical axis alignment between the free-space optical communication apparatuses 50 needs to have been carried out. FIG. 13 is an explanatory diagram of an example of optical axis alignment carried out by the free-space optical communication apparatuses 50. In the following description, for example, a flow of processing in which the free-space optical communication apparatus 50*a* carries out scanning and carries out optical axis alignment with the free-space optical communication apparatus 50*b* will be described. The optical axis alignment between any free-space optical communication apparatuses can also be carried out in the same manner. The "scanning" may be referred to as "search".

As illustrated in FIG. 13, the free-space optical communication apparatuses 50*a* and 50*b* include a light sending and receiving section 131 and an optical axis aligning section 132.

The light sending and receiving section 131 sends and receives light used in free-space optical communication. For example, the light sending and receiving section 131 of the free-space optical communication apparatus 50*a* directs light toward a predetermined angle range to send the light, and the light sending and receiving section 131 of the free-space optical communication apparatus 50*b* receives the light. Thus, free-space optical communication can be carried out. The specific configuration by which the light sending and receiving section 131 directs light is not limited thereto. For example, the light sending and receiving section 131 can have a configuration so as to include:

a beamforming antenna that directs a millimeter wave or submillimeter wave toward a predetermined angle range;

a collimator that collimates infrared, visible, or ultraviolet light;

a laser oscillator that produces laser light of infrared light, visible, or ultraviolet light; and a modulator that modulates laser light by changing the phase of a liquid crystal; etc.

The optical axis aligning section 132 controls the light sending and receiving section 131 to carry out optical axis alignment. In order to align the optical axes, the optical axis aligning section 132 sends scan light 133 to the light sending and receiving section 131 at different directions (scan with use of the scan light 133). Then, the scan light 133 sent from the light sending and receiving section 131 of the free-space optical communication apparatus 50*a* in a correct direction is received by the light sending and receiving section 131 of the free-space optical communication apparatus 50*b*.

The scan with use of the scan light 133 refers to, for example, a search carried out for identifying the position of the free-space optical communication apparatus 50*b*. The word scan is not intended to define a specific scanning order, etc. The scan light 133 contains identification information that identifies the free-space optical communication apparatus 50*a* and direction information (azimuth angle, elevation angle, and depression angle) that indicates the direction in which the light is sent.

When the light sending and receiving section 131 of the free-space optical communication apparatus 50*b* successfully receives the scan light 133, that is, the optical axes of the light sending and receiving sections 131 coincide with each other, the optical axis aligning section 132 of the free-space optical communication apparatus 50*b* acquires the identification information and the direction information that are contained in the scan light 133 and identifies the direction of the free-space optical communication apparatus 50*a*. The optical axis aligning section 132 of the free-space optical communication apparatus 50*b* identifies the distance to the free-space optical communication apparatus 50*a* in accordance with the attenuation of the scan light 133. This enables the optical axis aligning section 132 of the free-space optical communication apparatus 50*b* to identify the relative position of the free-space optical communication apparatus 50*a*.

Figure 14:
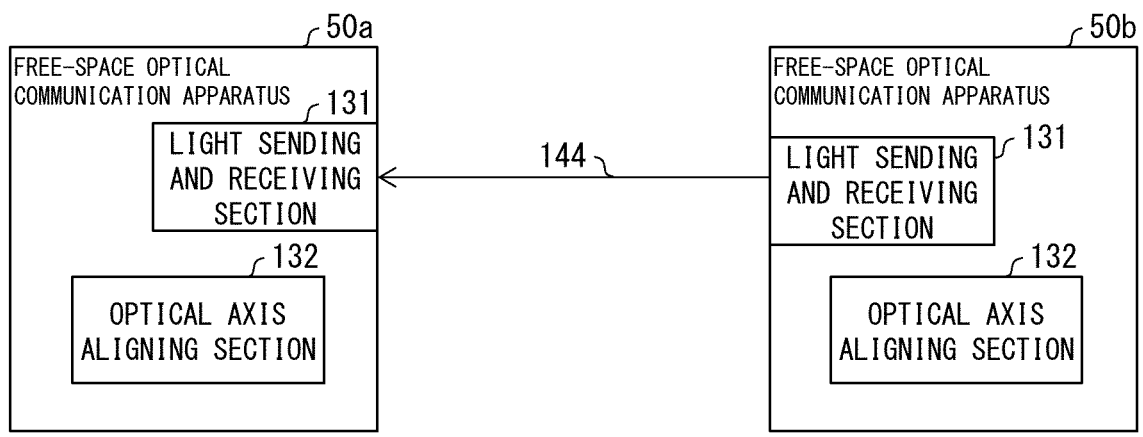
FIG. 14 is an explanatory diagram of an example of optical axis alignment carried out by free-space optical communication apparatuses.

As illustrated in FIG. 14, the optical axis aligning section 132 of the free-space optical communication apparatus 50*b* causes the light sending and receiving section 131 to send response light 144 toward the light sending and receiving section 131 of the free-space optical communication apparatus 50*a*. The response light 144 contains identification information that identifies the free-space optical communication apparatus 50*b*; direction information acquired from the scan light 133; and distance information that indicates the distance to the free-space optical communication apparatus 50*a* identified by the optical axis aligning section 132 of the free-space optical communication apparatus 50*b*. When the light sending and receiving section 131 of the free-space optical communication apparatus 50*a* receives the response light 144, the optical axis aligning section 132 of the free-space optical communication apparatus 50*b* can acquire the identification information, the direction information, and the distance information contained in the scan light 133, identify the direction of the free-space optical communication apparatus 50*b* and the distance to the free-space optical communication apparatus 50*b*, and identify the relative position of the free-space optical communication apparatus 50*b*. Thus, the optical axis alignment is completed.

As described above, by bidirectionally sending and receiving light between the free-space optical communication apparatuses 50, it is possible to carry out optical axis alignment with great accuracy. The optical axis aligning section 132 can estimate the distance to the other free-space optical communication apparatus 50 in accordance with the attenuation of light received from the other free-space optical communication apparatus 50. However, especially in an outdoor environment, since attenuation caused by the atmosphere or the weather greatly affects, the optical axis aligning section 132 may estimate the distance in accordance with the position information that is contained in the optical signal (scan light, response light) and that is possessed by the other free-space optical communication apparatus 50.

It is also possible to acquire the absolute position information regarding each free-space optical communication apparatus by the following mechanism. For example, in a case where a fixed free-space optical communication apparatus (hereinafter referred to as a free-space optical communication apparatus A) possesses the absolute position information regarding the free-space optical communication apparatus A, such as, for example, information that indicates a latitude and a longitude or information that indicates coordinates on a map corresponding to a communication area of the free-space optical communication network 51, the free-space optical communication apparatus A can estimate the absolute position information regarding the surrounding free-space optical communication apparatuses, from the relative position information on the positions of the surrounding free-space optical communication apparatuses relative to the free-space optical communication apparatus A, the relative position information being acquired by optical axis alignment, and the absolute position information on the absolute position of the free-space optical communication apparatus A.

Since the free-space optical communication apparatus A shares the absolute position information that is possessed by the free-space optical communication apparatus A and that is regarding the free-space optical communication apparatus A, with another free-space optical communication apparatus, the free-space optical communication apparatus other than the free-space optical communication apparatus A can also estimate the absolute position information regarding each free-space optical communication apparatus. This makes it possible to understand the absolute position of each free-space optical communication apparatus at any timing. It is thus possible to estimate an interruption of free-space optical communication by comparison with the movement route information.

As described above, the position information regarding each of the free-space optical communication apparatuses 50 is identified in accordance with the optical axis alignment between the free-space optical communication apparatuses 50 in the free-space optical communication network 51. The information acquiring means 1203 can acquire the position information regarding the free-space optical communication apparatus 50j, which is the position information regarding the mobile object 55.

The method of acquiring the position information by the information acquiring means 1203 is not limited to the above example, and various known methods can be used. For example, the position of the mobile object 55 may be calculated in accordance with an image of the mobile object 55 captured in the taken images of the cameras 57a and 57b. Alternatively, the position of the mobile object 55 may be calculated by transmitting and receiving beacons between the mobile object 55 and beacon equipment (not shown) disposed in the communication area 51a. However, by the information acquiring means 1203 acquiring the position information regarding the mobile object 55 in accordance with the position information regarding each of the free-space optical communication apparatuses 50, the position information being based on the optical axis alignment between the free-space optical communication apparatuses 50 in the free-space optical communication network 51, it is possible to provide accurate position information regarding the mobile object 55. This is because the accuracy of the direction in optical axis alignment is very strict, and the position information regarding each of the free-space optical communication apparatuses 50 based on optical axis alignment is therefore very accurate.

In accordance with the movement route information that indicates the movement route 56 of the mobile object 55 and the position information that indicates the position of the mobile object 55, the interruption estimating means 1201 estimates an interruption of free-space optical communication via the free-space optical communication paths 52 over the free-space optical communication network 51. For example, the interruption estimating means 1201 estimates an interruption of free-space optical communication via the free-space optical communication paths 52 by determining, in accordance with the movement route information and the position information, whether the mobile object 55 is to move to any place on the free-space optical communication paths 52.

Specifically, the interruption estimating means 1201 can estimate, in accordance with the movement route information and the position information, which stage of the movement route the mobile object 55 is at, and estimate a position to which the mobile object 55 is moving. Therefore, the interruption estimating means 501 can determine whether the estimated position after movement is on the free-space optical communication paths 52, to estimate: whether free-space optical communication via the free-space optical communication paths 52 is interrupted; and in a case where free-space optical communication is interrupted, via which of the free-space optical communication paths 52 free-space optical communication is interrupted. In a case where there are a plurality of movement destinations from the position indicated by the position information in the movement route indicated by the movement route information, when any of the movement destinations is to be interrupted, the interruption estimating means 1201 may estimate that an interruption occurs.

Like the interruption estimating means 101 in the first example embodiment, the interruption estimating means 1201 may also estimate that any free-space optical communication has been brought into a non-interruption state.

The path changing means 502 then changes the free-space optical communication paths 52 in accordance with the estimation result provided by the interruption estimating means 1201. For example, the path changing means 502 may stop the free-space optical communication via the free-space optical communication path 52 that is estimated to be interrupted and establish a new free-space optical communication path 52 that connects the starting point and the ending point of the free-space optical communication path 52 the free-space optical communication via which has been stopped. In this establishment, the path changing means 502 may establish the above new free-space optical communication path 52 by allowing free-space optical communication that is carried out via the free-space optical communication path 52 that is estimated to have been brought into a non-interruption state.

With the above configuration, it is possible for the free-space optical communication control system 1200 to avoid an interruption of free-space optical communication caused by movement of a mobile object the movement route of which is predetermined so as to be within the communication area 51*a* of the free-space optical communication network 51.

In the above description, the fourth example embodiment has been described as the free-space optical communication control system 1200. The free-space optical communication control system 1200 in accordance with the fourth example embodiment may be incorporated into a single apparatus to form a free-space optical communication control apparatus. The free-space optical communication control method in accordance with the fourth example embodiment may be the operation of the free-space optical communication control system 1200 in accordance with the fourth example embodiment.

Fifth Example Embodiment

A free-space optical communication control system 1500 in accordance with a fifth example embodiment will be described. The same reference sign is assigned to a component that has the same function as the component described in the first to fourth example embodiments, and the description thereof is omitted.

Figure 15:
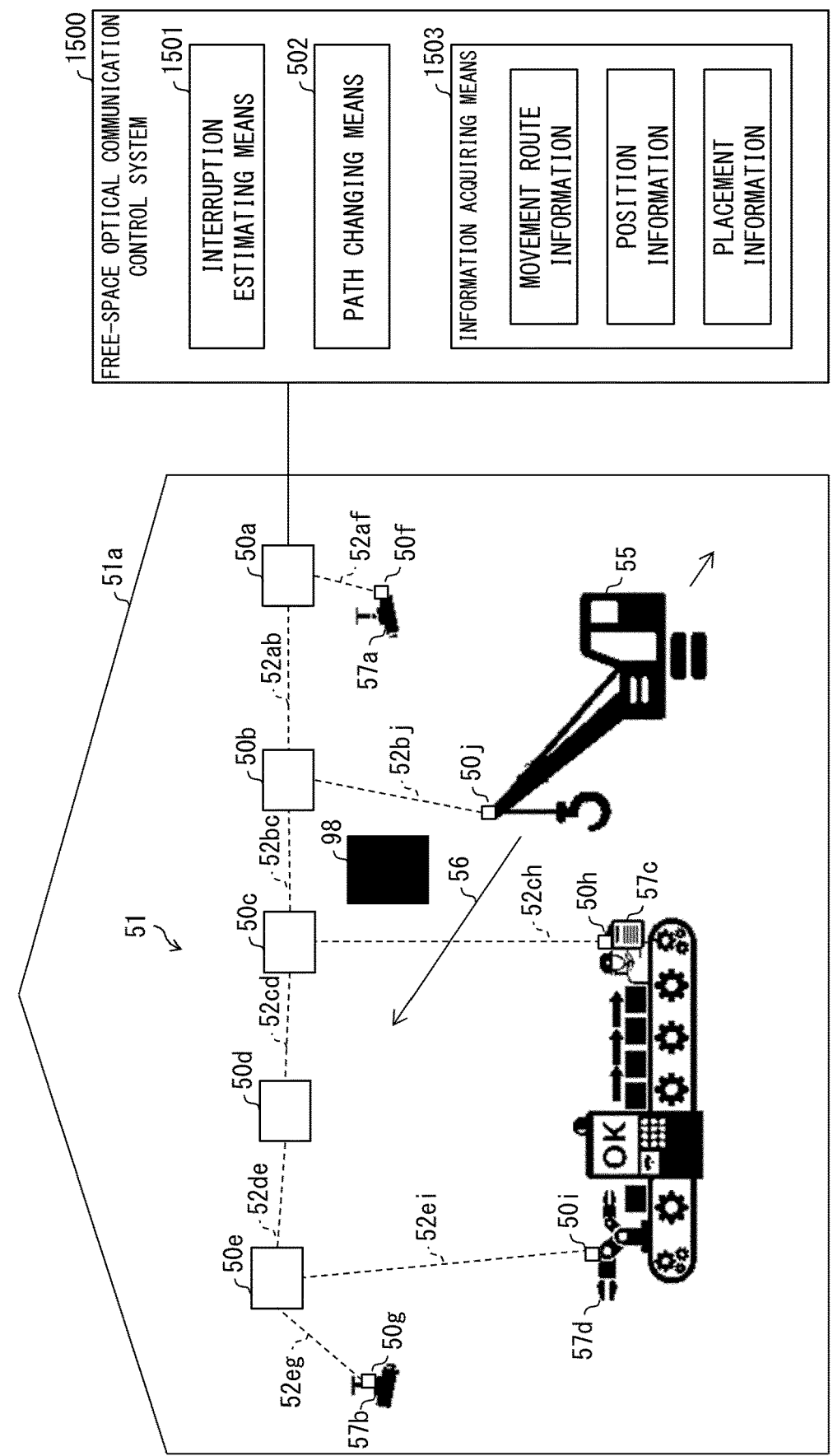
FIG. 15 is a block diagram of an example configuration of a free-space optical communication control system in accordance with a fifth example embodiment.

FIG. 15 is a block diagram of an example configuration of the free-space optical communication control system 1500 in accordance with the fifth example embodiment of the present invention. In FIG. 15, each of the blocks indicates a function-by-function component. Accordingly, the blocks illustrated in FIG. 15 may be implemented in a single apparatus, or may be implemented in more than one apparatus. Further, some or all of the blocks may be implemented as functions with use of the cloud or the like. As illustrated in FIG. 15, the free-space optical communication control system 1500 includes an interruption estimating means 1501, a path changing means 502, and an information acquiring means 1503.

The free-space optical communication control system 1500 is connected to a free-space optical communication network 51. The configuration of the free-space optical communication network 51 is the same as that in the third example embodiment. Specifically, the mobile object 55 includes a free-space optical communication apparatus 50*j* that is contained in the free-space optical communication network 51. Further, in the communication area 51*a*, a physical object 98 is disposed.

The information acquiring means 1503 includes, for example, storage for storing information, and stores movement route information and placement information. This enables the information acquiring means 1503 to acquire the movement route information and the placement information and provide the interruption estimating means 1501 and the path changing means 502 with the movement route information and the placement information. The information acquiring means 1503 may have a configuration so as to access an external database that stores movement route information and placement information, acquire the movement route information and the placement information, and provide the interruption estimating means 1501 and the path changing means 502 with the movement route information and the placement information.

The placement information acquired by the information acquiring means 1503 may be information that is inputted in advance, but at least part of the placement information may be generated by the information acquiring means 1503. Specifically, the information acquiring means (generating means) 1503 may generate placement information in accordance with images taken by the cameras 57*a* and 57*b*, which are image-taking means for taking an image of the inside of the communication area 51*a*. The information acquiring means 1503 may use a known technique for detecting, in accordance with a taken image, the position and the size of a physical object present in the image-taking area, to generate the placement information. In addition, the cameras 57*a* and 57*b* may be capable of acquiring depth information so that the information acquiring means 1503 can more accurately generate the placement information.

The information acquiring means 1503 also acquires position information that indicates the position of the mobile object 55 and provides the interruption estimating means 1501 and the path changing means 502 with the position information. For example, as described in the fourth example embodiment, in accordance with the position information regarding the free-space optical communication apparatuses 50 in the free-space optical communication network 51, the position information being based on the optical axis alignment between the free-space optical communication apparatuses 50, the information acquiring means (position acquiring means) 1503 may acquire the position information that indicates the position of the mobile object 55.

The interruption estimating means 1501 then estimates an interruption of free-space optical communication via the free-space optical communication paths 52 over the free-space optical communication network 51 in accordance with: movement route information that indicates a movement route 56 of the mobile object 55; position information that indicates the position of the mobile object 55; and placement information that indicates the physical object 98 placed within communication area 51*a*.

Like the interruption estimating means 1201 in the fourth example embodiment, the interruption estimating means 1501 can estimate, in accordance with the movement route information and the position information, a position to which the mobile object 55 is moving. Like the interruption estimating means 901 in the third example embodiment, the interruption estimating means 1501 estimates an interruption of free-space optical communication via the free-space optical communication paths 52 by determining whether a physical object indicated by the placement information interrupts a path that is included in the free-space optical communication paths 52 and that is between apparatuses one of which is the free-space optical communication apparatus 50*j* provided in the mobile object 55.

Like the interruption estimating means 101 in the first example embodiment, the interruption estimating means 1501 may also estimate that any free-space optical communication has been brought into a non-interruption state.

The path changing means 502 then changes the free-space optical communication paths 52 in accordance with the estimation result provided by the interruption estimating means 1501.

With the above configuration, it is possible for the free-space optical communication control system 1500 to avoid an interruption of free-space optical communication caused by movement of a mobile object the movement route of which is predetermined so as to be within the communication area 51*a* of the free-space optical communication network 51.

In the above description, the fifth example embodiment has been described as the free-space optical communication control system 1500. The free-space optical communication control system 1500 in accordance with the fifth example embodiment may be incorporated into a single apparatus to form a free-space optical communication control apparatus.

The free-space optical communication control method in accordance with the fifth example embodiment may be the operation of the free-space optical communication control system 1500 in accordance with the fifth example embodiment.

Application Example

Described in the second to fifth example embodiments is an example in which the communication area 51a is the inside of factory premises. However, the communication area 51a, which refers to an area in which free-space optical communication over the free-space optical communication network 51 can be carried out, is not limited to any particular area, provided that the area contains all the free-space optical communication apparatuses 50 forming the free-space optical communication network 51. The communication area 51a may be an indoor area, or may be an outdoor area. For example, the communication area 51a may be the inside of specific premises such as factory premises or any other building, the inside of the premises of outdoor steel-making plant or any other facility, or the inside of the premises of a live concert venue, a parking lot, etc. Alternatively, the communication area 51a is not the inside of specific premises, but may be, for example, an area such as a region of a road within which the free-space optical communication network 51 is established.

The present disclosure is not limited to the example embodiments above, but can be altered by a skilled person in the art in various ways. The present disclosure also encompasses, in its technical scope, any example embodiment derived by combining configurations, operations, and processes disclosed in differing example embodiments.

Figure 16:
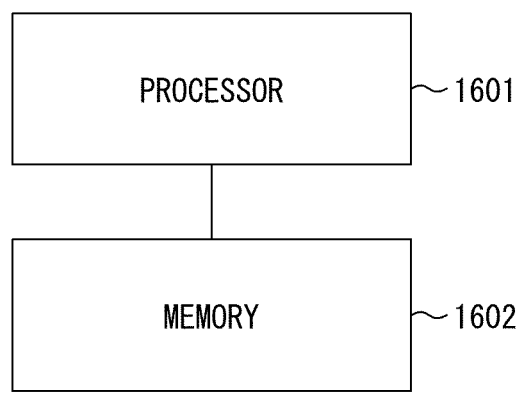
FIG. 16 is a schematic configuration diagram of hardware of a computer in accordance with the example embodiments.

Each of the components in accordance with the first to fifth example embodiments may be configured via a single piece of hardware. Each of the components in accordance with the first to fifth example embodiments may be configured via a single piece of software. Each of the components in accordance with the first to fifth example embodiments may be configured via a plurality of pieces of hardware. Each of the components in accordance with the first to fifth example embodiments may be configured via a plurality of pieces of software. The first to fifth example embodiments may be provided by a combination of hardware and software. Each of the functions in accordance with the first to fifth example embodiments may be implemented with use of the cloud. Each apparatus, each function, and each process may be provided with use of a computer including a processor 1601 and a memory 1602 as illustrated in FIG. 16. For example, a program for carrying out the free-space optical communication control methods described in the first to fifth example embodiments may be stored in the memory 1602, and the processor 1601 may retrieve and execute the program stored in the memory 1602, so that the functions described in the first to fifth example embodiments may be provided.

The program contains a set of instructions for, when the program is loaded into the computer, causing the computer to carry out one or more of the functions described in the first to fifth example embodiments. The program is stored in the memory 1602. Examples of the processor 1601 can encompass a central processing unit (CPU). Examples of the memory 1602 can encompass a read only memory (ROM), a random access memory (RAM), a flash memory, and a solid state drive (SSD).

The present disclosure is not limited to the example embodiments above. That is, the present invention can apply, within the scope of the present disclosure, various example aspects that could be understood by a person skilled in the art. All or some of the example embodiments above can also be described as below. Note, however, that the present invention is not limited to the following example aspects.

[Supplementary Note 1]

A free-space optical communication control system including: an interruption estimating means for estimating an interruption of free-space optical communication over a free-space optical communication network in accordance with movement route information that indicates a movement route of a mobile object movable within a communication area of the free-space optical communication network; and a path changing means for changing a path of the free-space optical communication in accordance with an estimation result provided by the interruption estimating means.

[Supplementary Note 2]

The free-space optical communication control system described in supplementary note 1, in which the interruption estimating means is configured to estimate the interruption of the free-space optical communication in accordance with the movement route information and time information that indicates a scheduled time of movement of the mobile object.

[Supplementary Note 3]

The free-space optical communication control system described in supplementary note 1, in which the interruption estimating means is configured to estimate the interruption of the free-space optical communication in accordance with the movement route information and position information that indicates a position of the mobile object.

[Supplementary Note 4]

The free-space optical communication control system described in supplementary note 3, in which: the mobile object includes a free-space optical communication apparatus that is contained in the free-space optical communication network; and the free-space optical communication control system further includes a position acquiring means for acquiring the position information, which indicates the position of the mobile object, in accordance with position information that is based on optical axis alignment between free-space optical communication apparatuses in the free-space optical communication network and that indicates a position of each of free-space optical communication apparatuses contained in the free-space optical communication network.

[Supplementary Note 5]

The free-space optical communication control system described in any one of supplementary notes 1 to 4, in which the interruption estimating means is configured to estimate the interruption of the free-space optical communication by determining, in accordance with the movement route information, whether the mobile object is to move to any place on the path of the free-space optical communication.

[Supplementary Note 6]

The free-space optical communication control system described in any one of supplementary notes 1 to 4, in which: the mobile object includes a free-space optical communication apparatus that is contained in the free-space optical communication network; and the interruption estimating means is configured to estimate the interruption of the free-space optical communication by determining, further in accordance with placement information that indicates a physical object placed within the communication area, whether the physical object interrupts the free-space optical communication between free-space optical communication apparatuses one of which is the free-space optical communication apparatus.

[Supplementary Note 7]

The free-space optical communication control system described in supplementary note 6, further including: an image-taking means for taking an image of an inside of the communication area; and a generating means for generating the placement information in accordance with an image taken by the image-taking means.

[Supplementary note 8] The free-space optical communication control system described in supplementary note 1, in which the communication area is an inside of specific premises.

[Supplementary Note 9]

A free-space optical communication control apparatus including: an interruption estimating section for estimating an interruption of free-space optical communication over a free-space optical communication network in accordance with movement route information that indicates a movement route of a mobile object movable within a communication area of the free-space optical communication network; and a path changing section for changing a path of the free-space optical communication in accordance with an estimation result provided by the interruption estimating section.

[Supplementary Note 10]

The free-space optical communication control apparatus described in supplementary note 9, in which the interruption estimating section is configured to estimate the interruption of the free-space optical communication in accordance with the movement route information and time information that indicates a scheduled time of movement of the mobile object.

[Supplementary Note 11]

The free-space optical communication control apparatus described in supplementary note 9, in which the interruption estimating section is configured to estimate the interruption of the free-space optical communication in accordance with the movement route information and position information that indicates a position of the mobile object.

[Supplementary Note 12]

The free-space optical communication control apparatus described in supplementary note 11, in which: the mobile object includes a free-space optical communication apparatus that is contained in the free-space optical communication network; and the free-space optical communication control apparatus further includes a position acquiring section for acquiring the position information, which indicates the position of the mobile object, in accordance with position information that is based on optical axis alignment between free-space optical communication apparatuses in the free-space optical communication network and that indicates a position of each of free-space optical communication apparatuses contained in the free-space optical communication network.

[Supplementary Note 13]

The free-space optical communication control apparatus described in any one of supplementary notes 9 to 12, in which the interruption estimating section is configured to estimate the interruption of the free-space optical communication by determining, in accordance with the movement route information, whether the mobile object is to move to any place on the path of the free-space optical communication.

[Supplementary Note 14]

The free-space optical communication control apparatus described in any one of supplementary notes 9 to 12, in which: the mobile object includes a free-space optical communication apparatus that is contained in the free-space optical communication network; and the interruption estimating section is configured to estimate the interruption of the free-space optical communication by determining, further in accordance with placement information that indicates a physical object placed within the communication area, whether the physical object interrupts the free-space optical communication between free-space optical communication apparatuses one of which is the free-space optical communication apparatus.

[Supplementary Note 15]

The free-space optical communication control apparatus described in supplementary note 14, further including: an image-taking section for taking an image of an inside of the communication area; and a generating section for generating the placement information in accordance with an image taken by the image-taking section.

[Supplementary Note 16]

The free-space optical communication control apparatus described in supplementary note 9, in which the communication area is an inside of specific premises.

[Supplementary Note 17]

A free-space optical communication control method including: estimating an interruption of free-space optical communication over a free-space optical communication network in accordance with movement route information that indicates a movement route of a mobile object movable within a communication area of the free-space optical communication network; and changing a path of the free-space optical communication in accordance with an estimation result of estimating the interruption of the free-space optical communication.

[Supplementary Note 18]

The free-space optical communication control method described in supplementary note 17, in which in estimating the interruption, the interruption of the free-space optical communication is estimated in accordance with the movement route information and time information that indicates a scheduled time of movement of the mobile object.

[Supplementary Note 19]

The free-space optical communication control method described in supplementary note 17, in which in estimating the interruption, the interruption of the free-space optical communication is estimated in accordance with the movement route information and position information that indicates a position of the mobile object.

[Supplementary Note 20]

The free-space optical communication control method described in supplementary note 19, in which: the mobile object includes a free-space optical communication apparatus that is contained in the free-space optical communication network; and the position information, which indicates the position of the mobile object, is acquired in accordance with position information that is based on optical axis alignment between free-space optical communication apparatuses in the free-space optical communication network and that indicates a position of each of free-space optical communication apparatuses contained in the free-space optical communication network.

[Supplementary Note 21]

The free-space optical communication control method described in any one of supplementary notes 17 to 20, in which in estimating the interruption, the interruption of the free-space optical communication is estimated by determining, in accordance with the movement route information, whether the mobile object is to move to any place on the path of the free-space optical communication.

[Supplementary Note 22]

The free-space optical communication control method described in any one of supplementary notes 17 to 20, in which: the mobile object includes a free-space optical communication apparatus that is contained in the free-space optical communication network; and in estimating the interruption, the interruption of the free-space optical communication is estimated by determining, further in accordance with placement information that indicates a physical object placed within the communication area, whether the physical object interrupts the free-space optical communication between free-space optical communication apparatuses one of which is the free-space optical communication apparatus.

[Supplementary Note 23]

The free-space optical communication control method described in supplementary note 22, in which the placement information is generated in accordance with a taken image of an inside of the communication area.

[Supplementary Note 24]

The free-space optical communication control method described in supplementary note 17, in which the communication area is an inside of specific premises.

REFERENCE SIGNS LIST 10, 50: Free-space optical communication apparatus
11, 51: Free-space optical communication network
11a, 51a: Communication area
12, 52: Free-space optical communication path
15, 55: Mobile object
16, 56: Movement route
98: Physical object
100, 500, 900, 1200, 1500: Free-space optical communication control system
101, 501, 901, 1201, 1501: Interruption estimating means
102, 502: Path changing means
503, 903, 1203, 1503: Information acquiring means
131: Light sending and receiving section
132: Optical axis aligning section
133: Scan light
144: Response light
400: Free-space optical communication control apparatus
401: Interruption estimating section
402: Path changing section
1601: Processor
1602: Memory

The invention claimed is:

1. A free-space optical communication control system comprising:
at least one processor,
the at least one processor being configured to execute:
an interruption estimation process of estimating an interruption of free-space optical communication over a free-space optical communication network in accordance with movement route information that indicates a movement route of a mobile object movable within a communication area of the free-space optical communication network; and
a path change process of changing a path of the free-space optical communication in accordance with an estimation result of the interruption estimation process, wherein:
the mobile object includes a free-space optical communication apparatus that is contained in the free-space optical communication network,
in the interruption estimation process, the at least one processor estimates the interruption of the free-space optical communication in accordance with the movement route information and position information that indicates a position of the mobile object, and
the at least one processor is further configured to execute a position acquisition process of acquiring the position information, which indicates the position of the mobile object, in accordance with position information that is based on optical axis alignment between free-space optical communication apparatuses in the free-space optical communication network and that indicates a position of each of free-space optical communication apparatuses contained in the free-space optical communication network.

2. The free-space optical communication control system according to claim 1, wherein, in the interruption estimation process, the at least one processor estimates the interruption of the free-space optical communication by determining, in accordance with the movement route information, whether the mobile object is to move to any place on the path of the free-space optical communication.

3. The free-space optical communication control system according to claim 1, wherein:
the mobile object includes a free-space optical communication apparatus that is contained in the free-space optical communication network,
in the interruption estimation process, the at least one processor estimates the interruption of the free-space optical communication by determining, further in accordance with placement information that indicates a physical object placed within the communication area, whether the physical object interrupts the free-space optical communication between free-space optical communication apparatuses one of which is the free-space optical communication apparatus, and
placement information includes a position at which the physical object is placed, a horizontal size of the physical object, and a vertical height of the physical object.

4. The free-space optical communication control system according to claim 3, wherein the at least one processor is further to execute a generation process of generating the placement information in accordance with an image representing an inside of the communication area.

5. A free-space optical communication control apparatus comprising:
at least one processor,
the at least one processor being configured to execute:
an interruption estimation process of estimating an interruption of free-space optical communication over a free-space optical communication network in accordance with movement route information that indicates a movement route of a mobile object movable within a communication area of the free-space optical communication network; and
a path change process of changing a path of the free-space optical communication in accordance with an estimation result of the interruption estimation process, wherein:
the mobile object includes a free-space optical communication apparatus that is contained in the free-space optical communication network,
in the interruption estimation process, the at least one processor estimates the interruption of the free-space optical communication in accordance with the movement route information and position information that indicates a position of the mobile object, and the at least one processor is further to execute a position acquisition process of acquiring the position information, which indicates the position of the mobile object, in accordance with position information that is based on optical axis alignment between free-space optical communication apparatuses in the free-space optical communication network and that indicates a position of each of free-space optical communication apparatuses contained in the free-space optical communication network.

6. The free-space optical communication control apparatus according to claim 5, wherein, in the interruption estimation process, the at least one processor estimates the interruption of the free-space optical communication by determining, in accordance with the movement route information, whether the mobile object is to move to any place on the path of the free-space optical communication.

7. The free-space optical communication control apparatus according to claim 5, wherein:

the mobile object includes a free-space optical communication apparatus that is contained in the free-space optical communication network, in the interruption estimation process, the at least one processor estimates the interruption of the free-space optical communication by determining, further in accordance with placement information that indicates a physical object placed within the communication area, whether the physical object interrupts the free-space optical communication between free-space optical communication apparatuses one of which is the free-space optical communication apparatus, and placement information includes a position at which the physical object is placed, a horizontal size of the physical object, and a vertical height of the physical object.

8. The free-space optical communication control apparatus according to claim 7, wherein the at least one processor is further configured to execute a generation process of generating the placement information in accordance with an image representing an inside of the communication area.

9. A free-space optical communication control method comprising:

estimating an interruption of free-space optical communication over a free-space optical communication network in accordance with movement route information that indicates a movement route of a mobile object movable within a communication area of the free-space optical communication network; and changing a path of the free-space optical communication in accordance with an estimation result of estimating the interruption of the free-space optical communication, wherein:

the mobile object includes a free-space optical communication apparatus that is contained in the free-space optical communication network, in estimating the interruption, the interruption of the free-space optical communication is estimated in accordance with the movement route information and position information that indicates a position of the mobile object, and the position information, which indicates the position of the mobile object, is acquired in accordance with position information that is based on optical axis alignment between free-space optical communication apparatuses in the free-space optical communication network and that indicates a position of each of free-space optical communication apparatuses contained in the free-space optical communication network.

10. The free-space optical communication control method according to claim 9, wherein, in estimating the interruption, the interruption of the free-space optical communication is estimated by determining, in accordance with the movement route information, whether the mobile object is to move to any place on the path of the free-space optical communication.

11. The free-space optical communication control method according to claim 9, wherein:

the mobile object includes a free-space optical communication apparatus that is contained in the free-space optical communication network, in estimating the interruption, the interruption of the free-space optical communication is estimated by determining, further in accordance with placement information that indicates a physical object placed within the communication area, whether the physical object interrupts the free-space optical communication between free-space optical communication apparatuses one of which is the free-space optical communication apparatus, and placement information includes a position at which the physical object is placed, a horizontal size of the physical object, and a vertical height of the physical object.

* * * * *